(12) United States Patent
Bailey et al.

(10) Patent No.: US 11,319,504 B2
(45) Date of Patent: May 3, 2022

(54) LUBRICANT WITH NANOPARTICULATE ADDITIVE

(71) Applicants: Novum Nano, LLC, Rapid City, SD (US); South Dakota Board of Regents, Pierre, SD (US)

(72) Inventors: Craig Bailey, Rapid City, SD (US); Greg Christensen, Hermosa, SD (US); Haiping Hong, Rapid City, SD (US)

(73) Assignees: Novum Nano LLC, Rapid City, SD (US); South Dakota Board of Regents, Pierre, SD (US)

( * ) Notice: Subject to any disclaimer, the term of this patent is extended or adjusted under 35 U.S.C. 154(b) by 0 days.

(21) Appl. No.: 17/146,396

(22) Filed: Jan. 11, 2021

(65) Prior Publication Data

US 2021/0388285 A1 Dec. 16, 2021

Related U.S. Application Data

(60) Provisional application No. 63/039,862, filed on Jun. 16, 2020.

(51) Int. Cl.
*C10M 125/00* (2006.01)
*C10M 169/04* (2006.01)
(Continued)

(52) U.S. Cl.
CPC ........ *C10M 169/04* (2013.01); *C10M 125/02* (2013.01); *C10M 125/26* (2013.01);
(Continued)

(58) Field of Classification Search
CPC .............. C10M 169/04; C10M 125/26; C10M 125/02; C10M 2201/041; C10M 2203/003;
(Continued)

(56) References Cited

U.S. PATENT DOCUMENTS

2008/0312111 A1* 12/2008 Malshe ................ C10M 169/04
508/155
2011/0003721 A1* 1/2011 Hong ..................... B82Y 30/00
508/113
(Continued)

FOREIGN PATENT DOCUMENTS

CN 110628488 A 12/2019

OTHER PUBLICATIONS

International Search Report and Written Opinion for PCT/US2021/033125, dated Sep. 9, 2021, 10 pages.

*Primary Examiner* — Prem G Singh
*Assistant Examiner* — Francis C Campanell
(74) *Attorney, Agent, or Firm* — Kilpatrick Townsend & Stockton LLP

(57) ABSTRACT

An engine oil additive includes carbon nanotubes and boron nitride particulates dispersed within a fluid. The additive is configured to be mixed with a quantity of oil such that the quantity of oil has a concentration from 0.05 to 0.5 grams of carbon nanotubes and of boron nitride particulates per quart of oil to improve the lubricity of the oil. The additive improves the horsepower and torque of the engine while reducing fuel consumption. The carbon nanotubes have an —OH functionalized exterior surface. The carbon nanotubes have a diameter from 1 nanometer to 50 nanometers and have a length from 1 micron to 1000 microns. The boron nitride particulates are hex-boron nitride structures having an average size from 30 nanometers to 500 nanometers.

12 Claims, 4 Drawing Sheets

(51) Int. Cl.
*C10M 125/02* (2006.01)
*C10M 125/26* (2006.01)
*B82Y 40/00* (2011.01)
*C10N 40/25* (2006.01)
*C10N 20/06* (2006.01)
*C10N 70/00* (2006.01)
*B82Y 30/00* (2011.01)

(52) U.S. Cl.
CPC ............... *B82Y 30/00* (2013.01); *B82Y 40/00* (2013.01); *C10M 2201/041* (2013.01); *C10M 2201/082* (2013.01); *C10M 2201/14* (2013.01); *C10M 2203/003* (2013.01); *C10N 2020/06* (2013.01); *C10N 2040/25* (2013.01); *C10N 2070/02* (2020.05)

(58) Field of Classification Search
CPC ........ C10M 2201/082; C10M 2201/14; B82Y 40/00; B82Y 30/00; C10N 2020/06; C10N 2040/25; C10N 2070/02
USPC .......................................................... 508/125
See application file for complete search history.

(56) References Cited

U.S. PATENT DOCUMENTS

| 2011/0015106 | A1* | 1/2011 | Habeeb ................ C10M 145/22 508/465 |
| 2013/0005619 | A1 | 1/2013 | Lee et al. |
| 2014/0371119 | A1* | 12/2014 | Mosleh .................. B82Y 30/00 508/129 |
| 2015/0275122 | A1 | 10/2015 | Schnipke et al. |
| 2019/0315625 | A1 | 10/2019 | Hong et al. |

\* cited by examiner

| BIKE | A | B | C | D | E | F | | | |
|---|---|---|---|---|---|---|---|---|---|
| BASE LINE 1 MAX POWER | 73.93 | 75.67 | 62.66 | 60.73 | 79.71 | 94.12 | | | |
| BASE LINE 2 MAX POWER | 77.64 | 77.15 | 63.82 | 61.58 | 79.42 | 95 | | | |
| BASE LINE 3 MAX POWER | 72.28 | 77.9 | 63.99 | 61.38 | 80.41 | 95.56 | | | |
| AVERAGE BASE LINE MAX POWER | 74.62 | 76.91 | 63.49 | 61.23 | 79.85 | 94.89 | | | |
| BASE LINE 1 MAX TORQUE | 91.7 | 79.91 | 79.62 | 74.28 | 104.36 | 112.11 | | | |
| BASE LINE 2 MAX TORQUE | 94.14 | 80.39 | 79.67 | 74.66 | 104.29 | 112.8 | | | |
| BASE LINE 3 MAX TORQUE | 92.37 | 81.13 | 80.58 | 73.94 | 104.14 | 112.78 | | | |
| AVERAGE BASE LINE MAX TORQUE | 92.74 | 80.48 | 79.96 | 74.29 | 104.26 | 112.56 | | | |
| OIL ADDITIVE 1 MAX POWER | 82.37 | 79.77 | 70.76 | 67.4 | 83.59 | 99.84 | | | |
| OIL ADDITIVE 1 MAX POWER | 82.99 | 80.32 | 70.37 | 67.42 | 83.15 | 100.58 | | | |
| OIL ADDITIVE 1 MAX POWER | 83.1 | 80.35 | 69.78 | 67.36 | 83.19 | 100.58 | | | |
| AVERAGE OIL ADDITIVE MAX POWER | 82.82 | 80.15 | 70.30 | 67.39 | 83.31 | 100.33 | | | |
| OIL ADDITIVE 1 MAX TORQUE | 99.91 | 84.38 | 90.63 | 81.42 | 107.18 | 116.64 | | | |
| OIL ADDITIVE 1 MAX TORQUE | 99.5 | 83.84 | 89.92 | 80.87 | 106.24 | 116.65 | | | |
| OIL ADDITIVE 1 MAX TORQUE | 99.42 | 83.96 | 87.92 | 80.87 | 105.88 | 116.65 | | | |
| AVERAGE OIL ADDITIVE MAX TORQUE | 99.61 | 84.06 | 89.49 | 81.05 | 106.43 | 116.65 | | | |
| PERCENT IMPROVEMENT MAX POWER | 10.99 | 4.21 | 10.73 | 10.07 | 4.34 | 5.73 | | | |
| PERCENT IMPROVEMENT MAX TORQUE | 7.41 | 4.45 | 11.92 | 9.10 | 2.08 | 3.63 | | | |
| AMOUNT NEEDED FOR MAX IMPROVEMENT | 125% | 150% | 100% | 200% | 125% | 175% | | AVERAGE | 146% |
| (PERCENT OF X, X=45:1) | | | | | | | | | |

FIG. 2A

| LUBRICANT | μ1000 RPM | μ2000 RPM | μ3000 RPM |
|---|---|---|---|
| 45:1 | 0.120 | 0.032 | 0.017 |
| MOBIL | 0.142 | 0.048 | 0.056 |
| OIL ADDITIVE | 0.059 | 0.017 | 0.107 |
| 9:1 | 0.029 | 0.012 | |

FIG. 2B

| OIL | "AVG. COF FROM 3 TESTS | % CHANGE FROM BASELINE |
|---|---|---|
| MOBIL 1 | 0.1048 | — — |
| OIL ADDITIVE | 0.0990 | -5.53% |

FIG. 2C

| TABLE 2: ENGINE OIL TEMPERATURE DURING OPERATION. | | |
|---|---|---|
| AMOUNT OF OIL ADDITIVE (g) | TARGET RPM RANGE | MAXIMUM TEMPERATURE (F) |
| 0 | 2100-3000 | 144.8 |
| 7 | 2100-3000 | 161.6 |
| 14 | 2100-3000 | 149.75 |
| 28 | 2100-3000 | 155.45 |

FIG. 2D

|  | DETAILS | SCAR LENGTH (mm) | SCAR WIDTH (mm) | FRICTION COEFFICIENT |
|---|---|---|---|---|
| MWNT-OH | DIAMETER 20-40 nm, LENGTH 10-30 μm, -OH CONTENT 1.63%, HIGH PURITY>97% | 1.369 | 0.773 | 0.0687 |
| MWNT-OH | DIAMETER 10-30 nm, LENGTH 10-30 μm, -OH CONTENT 2.48%, PURITY>95% | 1.716 | 0.499 | 0.0853 |
| MWNT-OH | DIAMETER 30-80 nm, LENGTH 10-30 μm, -OH CONTENT 0.76%, PURITY>95% | 1.012 | 0.547 | 0.0735 |
| SWNT-OH | DIAMETER 1-2 nm, LENGTH 5-30 μm, -OH CONTENT 3.96%, PURITY>90% | 0.523 | 0.807 | 0.0738 |
| MOBIL 1 | 5W-40 | 1.541 | 0.453 | 0.0960 |

FIG. 3

LUBRICANT WITH NANOPARTICULATE ADDITIVE

CROSS-REFERENCES TO OTHER APPLICATIONS

This application claims priority to U.S. provisional patent application Ser. No. 63/039,862, for "LUBRICANT WITH NANOPARTICULATE ADDITIVE" filed on Jun. 16, 2020 which is hereby incorporated by reference in entirety for all purposes.

This invention was made with Government support under FA8649-20-9-9046 awarded by the United States Air Force Small Business Innovation Research/Small Business Technology Transfer Center of Excellence. The Government has certain rights in the invention.

BACKGROUND

Currently there are a wide variety of engines, transmissions and tribolological applications that employ a lubricant to reduce friction between surfaces. New lubricants having an increased lubricity are needed to reduce wear, reduce heat generation and reduce power consumption of these devices.

SUMMARY

In some embodiments a fluid comprises an oil, carbon nanotubes, and boron nitride particulates. In various embodiments the fluid has a concentration from 0.01 to 1 gram of carbon nanotubes per quart of oil. In some embodiments the fluid has a concentration from 0.01 to 1 gram of boron nitride particulates per quart of oil. In various embodiments the fluid has a concentration from 0.05 to 0.5 grams of carbon nanotubes per quart of oil. In some embodiments the fluid has a concentration from 0.05 to 0.5 grams of boron nitride particulates per quart of oil. In various embodiments the carbon nanotubes have a functionalized exterior surface. In some embodiments the carbon nanotubes have a diameter from 1 nanometer to 50 nanometers and have a length from 1 micron to 1000 microns. In various embodiments the boron nitride particulates are hex-boron nitride structures having an average size from 30 nanometers to 500 nanometers.

In some embodiments a concentrate comprises a fluid, carbon nanotubes dispersed within the fluid and boron nitride particulates dispersed within the fluid. In various embodiments the concentrate is configured to be added to a predetermined quantity of oil such that the predetermined quantity of oil has a concentration of 0.05 to 0.5 grams of carbon nanotubes per quart of oil. In some embodiments the concentrate is configured to be added to a predetermined quantity of oil such that the predetermined quantity of oil has a concentration of 0.05 to 0.5 grams of boron nitride particulates per quart of oil. In various embodiments the carbon nanotubes have a functionalized exterior surface. In some embodiments the carbon nanotubes have a diameter from 1 nanometer to 50 nanometers and have a length from 1 micron to 1000 microns. In various embodiments the boron nitride particulates are hex-boron nitride structures having an average size from 30 nanometers to 500 nanometers.

In some embodiments an engine oil additive comprises a fluid, carbon nanotubes dispersed within the fluid and boron nitride particulates dispersed within the fluid. In various embodiments the engine oil additive is configured to be mixed with a quantity of oil such that the quantity of oil has a concentration from 0.05 to 0.5 grams of carbon nanotubes per quart of oil. In some embodiments the engine oil additive is configured to be mixed with a quantity of oil such that the quantity of oil has a concentration from 0.05 to 0.5 grams of boron nitride particulates per quart of oil. In some embodiments the carbon nanotubes have a functionalized exterior surface. In various embodiments the carbon nanotubes have a diameter from 1 nanometer to 50 nanometers and have a length from 1 micron to 1000 microns. In some embodiments the boron nitride particulates are hex-boron nitride structures having an average size from 30 nanometers to 500 nanometers.

Numerous benefits are achieved by way of the present invention over conventional techniques. For example, embodiments of the present invention reduce the coefficient of friction between two surfaces. When the lubricating oil of an engine is modified with the carbon nanotubes and boron nitride particulates the engine generates increased power and increased torque while reducing fuel consumption. These and other embodiments of the invention along with many of its advantages and features are described in more detail in conjunction with the text below and attached figures.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

BRIEF DESCRIPTION OF THE DRAWINGS

FIG. 2A illustrates a table of test results from six different motorcycles that were tested with and without the nanomaterial modified oil of FIG. 1;

FIG. 2B illustrates a table of coefficient of friction test results from a micro-friction and wear pin-on-disk test apparatus using the nanomaterial modified oil of FIG. 1;

FIG. 2C illustrates a table of friction testing from an ASTM G77 Block-on-Ring test apparatus using the nanomaterial modified oil of FIG. 1;

FIG. 2D illustrates a table showing oil temperature data during engine operation using the nanomaterial modified oil of FIG. 1; and FIG. 3 illustrates a table showing friction test data related to different degrees of —OH functionalization and geometries for carbon nanotubes dispersed within a lubricious fluid, according to embodiments of the disclosure.

DETAILED DESCRIPTION

Figure 1:
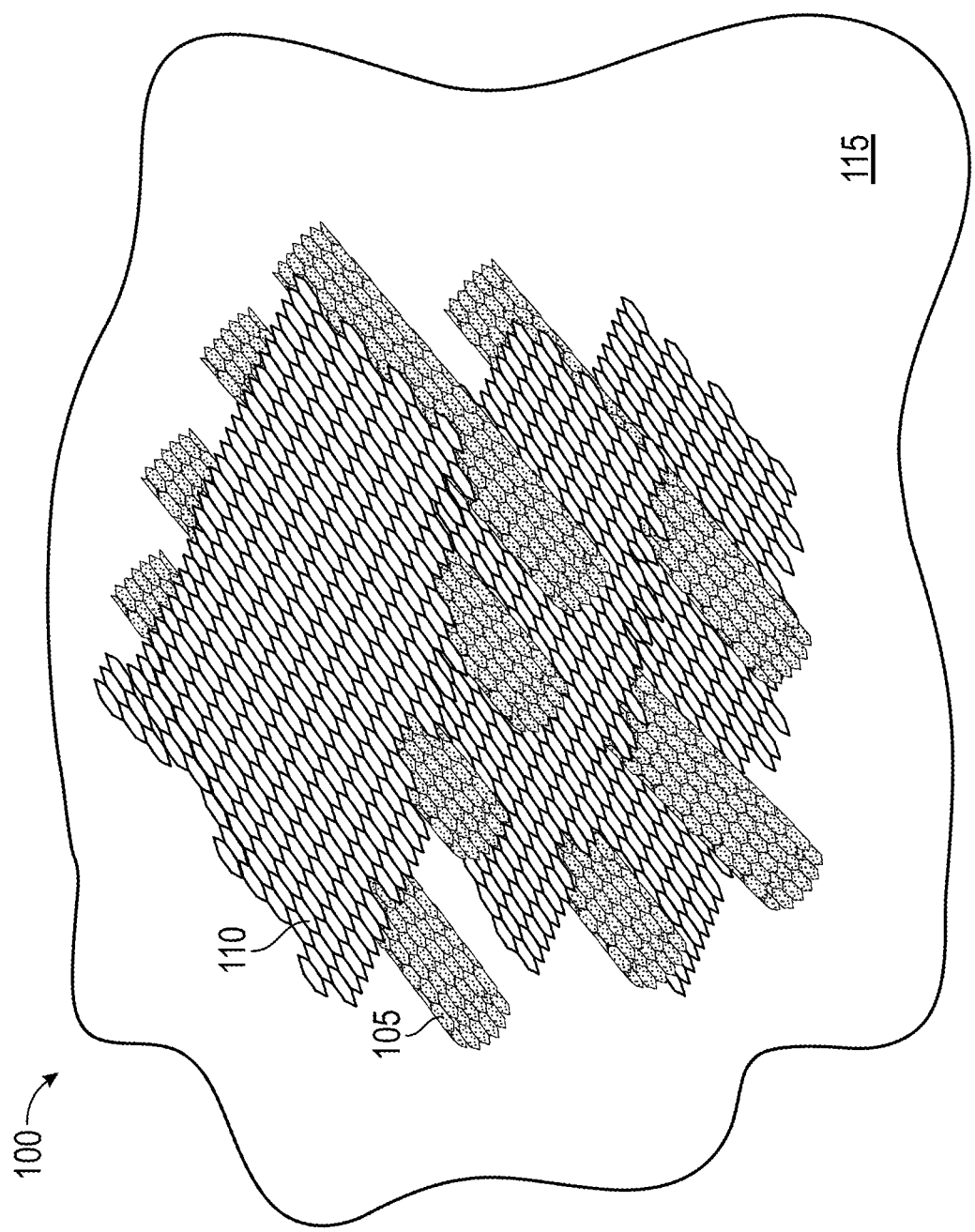
FIG. 1 is a non-scaled rendering of a nanomaterial modified oil that includes carbon nanotubes and boron nitride nanoparticulates dispersed within a lubricious fluid, according to an embodiment of the disclosure.

Techniques disclosed herein relate generally to lubricants. More specifically, techniques disclosed herein relate to lubricious oils that contain a combination of nanomaterial particulates for reducing friction in engines and other types of machinery. Various inventive embodiments are described herein, including methods, processes, systems, devices, and the like.

In order to better appreciate the features and aspects of the present disclosure, further context for the disclosure is provided in the following section by discussing one particular implementation of an engine oil lubricant containing carbon nanotubes and boron nitride nanoparticulates, according to embodiments of the disclosure. These embodiments are for explanatory purposes only and other embodiments may employ other combinations of lubricious materials that may be used for different purposes. For example, embodiments of the disclosure can be used with any lubricant that is configured to reduce friction between two surfaces such as a grease or tribological coating.

FIG. 1 illustrates an artistic non-scaled rendering of a nanomaterial modified oil 100 that is a combination of carbon nanotubes 105 and boron nitride nanoparticulates 110 dispersed within a lubricious fluid 115, according to embodiments of the disclosure. As shown in FIG. 1, a plurality of carbon nanotubes 105 are intermingled with a plurality of boron nitride nanoparticulates 110. It will be appreciated that the orientation of carbon nanotubes 105 and boron nitride nanoparticulates 110 may be different than illustrated in FIG. 1. In one embodiment lubricious fluid 115 is an oil designed to be a lubricant for an internal combustion engine, however other embodiments can use different lubricious fluids.

Carbon Nanotubes

Carbon nanotubes 105 can have any suitable shape or concentration. In some embodiments the carbon nanotubes 105 can have a diameter between 1 nanometer to 50 nanometers and can have a length from 1 micron to 1000 microns. In one embodiment carbon nanotubes 105 are multi-walled nanotubes having a diameter between 20 nanometers and 40 nanometers and a length that is between 10 microns and 30 microns. In one embodiment carbon nanotubes 105 have a diameter between 1 and 2 nanometers and a length that is between 1.5 and 2.5 microns. In other embodiments the nanotubes can be single-walled, double-walled or a combination of any of single-walled, double-walled and/or multi-walled including up to 20 or more walls.

In some embodiments all, or a portion of carbon nanotubes 105 can have a functionalized surface. In one embodiment the functionalized surface includes, but is not limited to: —OH, —COOH, =O, —F, —Cl, —NH—R, —NH2, —OR, —P or any combination capable of hydrogen bonding. In one embodiment carbon nanotubes 105 have a functionalized OH surface that may form hydrogen bonds between the carbon nanotubes and the boron nitride nanoparticulates 110. The hydrogen bonds can increase the thermal conductivity and electrical conductivity of the nanomaterial modified oil 100 and may also improve the lubricity. As would be appreciated by one of skill in the art with the benefit of this disclosure, other surface modifications of the carbon nanotubes can be used to modify the way in which the carbon nanotubes interact with boron nitride particulates 110 and/or with lubricious fluid 115, and are within the scope of this disclosure.

Boron Nitride Nanoparticulates

Boron nitride nanoparticulates 110 can have any suitable shape or concentration. In one embodiment boron nitride nanoparticulates 110 are hex-boron nitride structures and have an average particle size of approximately 70 nanometers. In other embodiments the average particle size can be between 10 nanometers and 10,000 nanometers, while in further embodiments the average particle size can be between 30 nanometers and 500 nanometers and in some embodiments can be between 50 and 90 nanometers.

In further embodiments any structure of boron nitride can be used including a hexagonal structure in the form of a sheet rolled on itself, similar to that of carbon nanotubes. Other boron nitride structures such as amorphous, cubic (c-BN) and wurtzite (w-BN) can be used.

Lubricious Fluid

Lubricious fluid 115 can be any suitable natural or synthetic oil, or blend thereof. Natural sources of base oils for lubricious fluid 115 include hydrocarbon oils of lubricating viscosity derived from petroleum, tar sands, coal, shale, and so forth, as well as natural oils such as rapeseed oil, and the like. Synthetic base stocks include, for example, poly-α-olefin oils (PAO, such as hydrogenated or unhydrogenated α-olefin oligomers), hydrogenated polyolefins, alkylated aromatics, polybutenes, alkyl esters of dicarboxylic esters, complex esters of dicarboxylic esters, polyol esters, polyglycols, polyphenyl ethers, alkyl esters of carbonic or phosphoric acids, polysilicones, fluorohydrocarbon oils, and mixtures thereof. The poly-α-olefins may, for example, be oligomers of branched or straight chain α-olefins having from 2 to 16 carbon atoms, specific examples being polypropenes, polyisobutenes, poly-1-butenes, poly-1-hexenes, poly-1-octenes and poly-1-decene. Included are homopolymers, interpolymers and mixtures.

In one embodiment, mineral oil base stocks are used, such as, for example, conventional and solvent-refined paraffinic neutrals and bright stocks, hydrotreated paraffinic neutrals and bright stocks, naphthenic oils, cylinder oils, and so forth, including straight run and blended oils. In one more particular embodiment, synthetic base stocks can be used such as, for example, blends of poly-α-olefins with synthetic diesters in weight proportions (PAO:ester) ranging from about 95:5 to about 50:50.

The base oils will normally, but not necessarily always, have a viscosity range of SAE 0 to about SAE 250, and more usually about SAE 0 to about SAE 50. The viscosity ranges can also be multi-viscosity ranges such as, but not limited to 5W-30, 0W-40, 15W-40, etc.

Base stock oils suitable for use in the present invention may be made using a variety of different processes including but not limited to distillation, solvent refining, hydrogen processing, oligomerisation, esterification, and re-refining. For instance, poly-α-olefins (PAO) include hydrogenated oligomers of an α-olefin, the most important methods of oligomerisation being free radical processes, Ziegler catalysis, and cationic, Friedel-Crafts catalysis.

Certain of these types of base oils may be used for the specific properties they possess such as biodegradability, high temperature stability, or non-flammability. In other compositions, other types of base oils may be preferred for reasons of availability or lower cost. Thus, the skilled artisan will recognize that while various types of base oils discussed above may be used in the lubricant compositions of this invention, they are not necessarily equivalents of each other in every application. In some embodiments lubricious fluid may be a lubricant commonly known as a synthetic blend, a full-synthetic or a non-synthetic engine oil.

Nanomaterial Concentrations

A predetermined quantity of carbon nanotubes 105 and boron nitride nanoparticulates 110 can be added to a predetermined quantity of lubricious fluid 115 to provide a final desired concentration of carbon nanotubes and boron nitride nanoparticulates for a particular application. In one embodiment the final concentration can be 0.08 grams of carbon nanotubes 105 and 0.08 grams of boron nitride nanoparticulates 110 per quart of lubricious fluid 115. In further embodiments additional reductions in engine friction can be experienced using a final concentration of 0.16 grams of carbon nanotubes 105 and 0.16 grams of boron nitride nanoparticulates 110 per quart of lubricious fluid 115. In yet further embodiments a final concentration of 0.24 grams of carbon nanotubes 105 and 0.24 grams of boron nitride nanoparticulates 110 per quart of lubricious fluid 115 can be used.

The concentrations described above are for example only and other suitable concentrations are within the scope of this disclosure. In some embodiments a final concentration of carbon nanotubes 105 within a quart of lubricious fluid 115 can be between 0.01 gram and 1 gram. In other embodiments the concentration of carbon nanotubes 105 can be between 0.05 and 0.5 grams and in some embodiments the concentration can be between 0.07 and 0.17 grams per quart of lubricious fluid 115.

In some embodiments a final concentration of boron nitride nanoparticulates 110 within a quart of lubricious fluid 115 can be between 0.01 gram and 1 gram. In other embodiments the concentration of boron nitride nanoparticulates 110 can be between 0.05 and 0.5 grams and in some embodiments the concentration can be between 0.07 and 0.17 grams per quart of lubricious fluid 115.

In further embodiments the final concentration of carbon nanotubes 105 and boron nitride nanoparticulates 110 within lubricious fluid 115 may not be equal. In some embodiments the concentration of boron nitride nanoparticulates 110 may be greater than the concentration of carbon nanotubes 105 by 1.5 times to 50 times while in other embodiments it can be between 2 times and 25 times and in some embodiments can be between 3 times and 10 times the concentration of carbon nanotubes.

In some embodiments the concentration of carbon nanotubes 105 may be greater than the concentration boron nitride nanoparticulates 110 by 1.5 times to 50 times while in other embodiments it can be between 2 times and 25 times and in some embodiments it can be between 3 times and 10 times the concentration of boron nitride nanoparticulates.

Concentrated Additive

In some embodiments nanomaterial modified oil 100 can be formulated as a concentrated additive that can be added to a predetermined quantity of lubricious fluid 115 or other fluid that does not have the carbon nanotube or boron nitride nanoparticulates. Thus, after adding the concentrated additive to the predetermined quantity of oil, the resulting mixture has a final desired concentration of carbon nanotubes and boron nitride nanoparticulates, as described above. In such a way, with each oil change a predetermined amount of the concentrated additive can be added to the newly added oil to provide the engine with the desired level of horsepower, efficiency, torque and/or other improvements in engine performance.

As an illustrative non-limiting example, a concentrated additive can include between 3.5 percent and 4.5 percent by weight each of carbon nanotubes 105 and boron nitride nanoparticulates 110. More specifically, in one example the concentrated additive can include 200 grams of carbon nanotubes 105 and 200 grams of boron nitride nanoparticulates 110 that are dispersed within 5000 grams of lubricious fluid 115 such that the carbon nanotubes and the boron nitride nanoparticulates are each 3.7 percent of the total weight of the concentrated additive. In other embodiments the weight percent of the carbon nanotubes can be between 2 percent and 20 percent and the weight percent of the boron nitride nanoparticulates can be between 2 percent and 20 percent of the concentrated additive. In some embodiments the concentration of the carbon nanotubes may not be the same as the concentration of boron nitride nanoparticulates, as described above. In further embodiments the quantity of carbon nanotubes 105 and boron nitride nanoparticulates 110 that are in the concentrated additive can be predetermined to yield a final concentration of 0.08 grams per quart of lubricious fluid, or other concentrations as described above.

Benefits of Nanomaterial Oil

Nanomaterial modified oil 100 can improve engine efficiency by reducing friction and increasing thermal conductivity. Nanomaterial modified oil 100 can also provide an extended lifetime of internal engine components and provide fuel savings. The addition of a combination of carbon nanotubes 105 and boron nitride nanoparticulates 110 has demonstrated unexpected results, with improvements in performance beyond what was expected with the addition of carbon nanotubes or boron nitride nanoparticulates alone.

Fuel Efficiency Tests

Fifteen test vehicles ranging from 1990 to 2020 model years of various makes and types were tested using nanomaterial modified oil 100. Drivers reported improved starts, noticeable power increase, and up to 12 percent better fuel economy.

A Briggs and Stratton CR950 engine was tested using nanomaterial modified oil 100 with different concentrations of the nanomaterials. Engine tear down revealed no measurable wear. The results are summarized below:

2100 RPM
  14 g of the additive yielded a 4.3 percent increase in efficiency compared to oil without the additive.
2600 RPM
  7 g of additive increased efficiency the most with an improvement of 13.57 percent.
  14 g of additive yielding a performance increase of 13.47 percent
  28 g of additive improved performance by 5.25 percent.
3000 RPM
  14 g of additive has a 21.6 percent improvement over the base oil,
  28 g solution had a positive increase of about 12.22 percent.

Horsepower and Torque Tests

FIG. 2A illustrates a table of test results from six different motorcycles A-F that were tested with and without the nanoparticulate additive. As shown in FIG. 2A each test bike A-F demonstrated improvements in maximum power and maximum toque with the additive. In some cases the additive resulted in an improvement of approximately 11 percent in maximum power and nearly 12 percent in maximum torque.

Coefficient of Friction Tests

FIG. 2B shows coefficient of friction results from a controlled atmosphere micro-friction and wear tester pin-on-disk setup at room temperature with a load of 200 g at three different rotational speeds of 1000 rpm, 2000 rpm, and 3000 rpm for 60 minutes with 0.2 milliliters of nanomaterial modified oil added to the surface every 6 minutes. The results show a significant improvement over the test standard of Mobil® Delvac® 1 ESP motor oil. A ratio of 45-parts Mobil® oil to 1-part nanomaterial modified oil significantly decreases the friction coefficient at any rpm compared to the Mobil® oil alone. In this test the 45:1 ratio is equivalent to 0.08 grams of carbon nanotubes and 0.08 grams of boron nitride nanoparticulates dispersed within 1 quart of lubricious fluid.

This 45:1 ratio provides a 15.5 percent friction reduction over Mobil® motor oil at 1000 rpm, a 33.3 percent friction reduction at 2000 rpm and, a 69.6 percent friction reduction at 3000 rpm. Oil additive at a 9:1 ratio provides a 79.6 percent friction reduction over Mobil® motor oil at 1000 rpm and a 75.0 percent friction reduction at 2000 rpm. This ratio may be more beneficial for lower rpm diesel engines, while the less concentrated ratios may be better for higher revving gasoline engines. The combination of the hexagonal boron nitride sheets and carbon nanotubes provides an even greater reduction in friction coefficient than either the carbon nanotubes or the boron nitride nanoparticles alone.

FIG. 2C shows another example of friction testing using ASTM G77 Block-on-Ring testing. The nanomaterial modified oil showed an average coefficient of friction that was 5.53 percent lower than that of the Mobil® 1 base oil. In this test the 0.08 grams of carbon nanotubes and 0.08 grams of boron nitride nanoparticulates were dispersed within 1 quart of lubricious fluid.

Oil Temperature Tests

FIG. 2D shows a table that contains oil temperature data during engine operation. The average oil temperature is given for each incremental amount of concentrated additive. The average temperature increased with the oil additive due to the increased thermal conductivity and/or heat capacity of the oil and its ability to transfer heat from the engine components. In this test, the amount of concentrated oil additive was incrementally increased from 0 grams to 28 grams. In this test 7 grams of the concentrated oil additive resulted in a final concentration of 0.08 grams of carbon nanotubes and 0.08 grams of boron nitride nanoparticulates per 1 quart of lubricious fluid. With the addition of an oil cooler it is anticipated the oil temperature would drop considerably when compared to the normal oil temperature.

Degree of —OH Functionalization and CNT Geometry

FIG. 3 shows a table that contains friction test data related to different degrees of —OH functionalization and geometries for carbon nanotubes. As shown in FIG. 3, the carbon nanotube diameters vary from 1 nm to 80 nm. All of the multi wall nanotubes had the same length range of 10-30 μm. As also shown in FIG. 3, the hydroxyl (OH) group concentration varies from 0.76 percent to 3.96 percent.

All variations that include carbon nanotubes produced a lower coefficient of friction when compared to commercial full synthetic Mobil® 1 engine oil. The results also indicate that a higher degree of —OH functionalized may not be needed in order to obtain the highest performance. More specifically, in some embodiments the —OH functionalization percentage can be between 0.5 percent to 10 percent, and in some embodiments is between 1 percent and 3 percent and in various embodiments is between 1.2 percent and 2 percent.

In some embodiments the carbon nanotubes are multi-walled nanotubes with a diameter from 20 to 40 nanometers, a length from 10 to 30 microns, an —OH content of approximately 1.6 percent and a purity of greater than 97 percent.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

What is claimed is:

1. A fluid comprising:
    an oil;
    a plurality of carbon nanotubes dispersed within the oil and each having a diameter between 1 nanometer and 80 nanometers, wherein at least 0.76 percent of the plurality of carbon nanotubes have OH functionalized surfaces; and
    a plurality of boron nitride particulates dispersed within the oil, wherein each of the plurality of boron nitride particulates are separate from each of the plurality of carbon nanotubes and have an average particle size between 50 nanometers and 90 nanometers; and
    wherein a concentration of the plurality of carbon nanotubes is between 0.08 grams and 0.4 grams per 946 milliliters of the oil and wherein a concentration of the plurality of boron nitride particulates is between 0.08 grams and 0.4 grams per 946 milliliters of the oil.

2. The fluid of claim 1 wherein at least some of the plurality of carbon nanotubes are multi-walled carbon nanotubes.

3. The fluid of claim 1 wherein an average length of the plurality of carbon nanotubes is between 1 micron and 1000 microns.

4. The fluid of claim 1 wherein the boron nitride particulates are hex-boron nitride, cubic boron nitride or wurtzite boron nitride particulates.

5. A concentrate comprising:
    a fluid;
    a plurality of carbon nanotubes dispersed within the fluid, wherein each carbon nanotube of the plurality of carbon nanotubes has a diameter between 1 nanometer and 80 nanometers and wherein at least 0.76 percent of the plurality of carbon nanotubes have OH functionalized surfaces; and
    a plurality of boron nitride particulates dispersed within the fluid, wherein each of the plurality of boron nitride particulates are separate from each of the plurality of carbon nanotubes, and wherein the plurality of boron nitride particulates have an average particle size between 50 nanometers and 90 nanometers; and
    wherein the concentrate is configured to be mixed with a predetermined quantity of oil such that the mixture of the predetermined quantity of oil and the concentrate has a carbon nanotube concentration between 0.08 grams and 0.4 grams per 946 milliliters of the oil and a boron nitride particulate concentration between 0.08 grams and 0.4 grams per 946 milliliters of the oil.

6. The concentrate of claim 5 wherein at least some of the plurality of carbon nanotubes are multi-walled carbon nanotubes.

7. The concentrate of claim 5 wherein an average length of the plurality of carbon nanotubes is between 1 micron and 1000 microns.

8. The concentrate of claim 5 wherein each of the boron nitride particulates of the plurality of boron nitride particulates are hex-boron nitride, cubic boron nitride or wurtzite boron nitride particulates.

9. An engine oil additive comprising:
- a plurality of unitary carbon nanotubes each having a diameter between 1 nanometer and 80 nanometers, wherein at least 0.76 percent of the plurality of carbon nanotubes have an OH functionalized surface; and
- a plurality of unitary boron nitride particulates having an average particle size between 50 nanometers and 90 nanometers;
- wherein the additive is configured to be mixed with a predetermined quantity of engine oil such that the mixture has a carbon nanotube concentration between 0.08 grams and 0.4 grams per 946 milliliters of the engine oil and a boron nitride particulate concentration between 0.08 grams and 0.4 grams per 946 milliliters of the engine oil.

10. The engine oil additive of claim 9 wherein at least some of the plurality of carbon nanotubes are multi-walled carbon nanotubes.

11. The engine oil additive of claim 9 wherein an average length of the plurality of carbon nanotubes is between 1 micron and 1000 microns.

12. The engine oil additive of claim 9 wherein each of the boron nitride particulates of the plurality of boron nitride particulates are hex-boron nitride, cubic boron nitride or wurtzite boron nitride particulates.

\* \* \* \* \*